May 15, 1951 — C. W. THORNHILL — 2,552,750
PIPE JOINT
Filed July 6, 1945
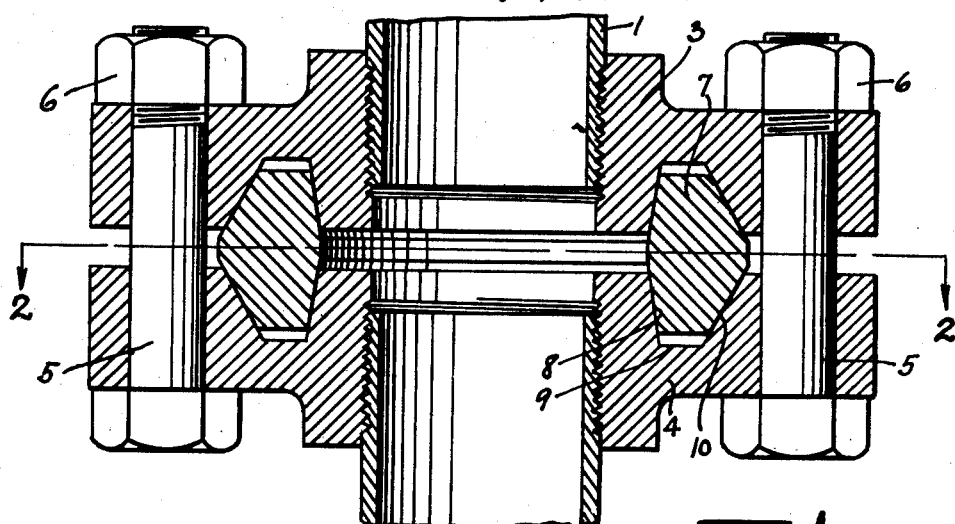
Fig.1.
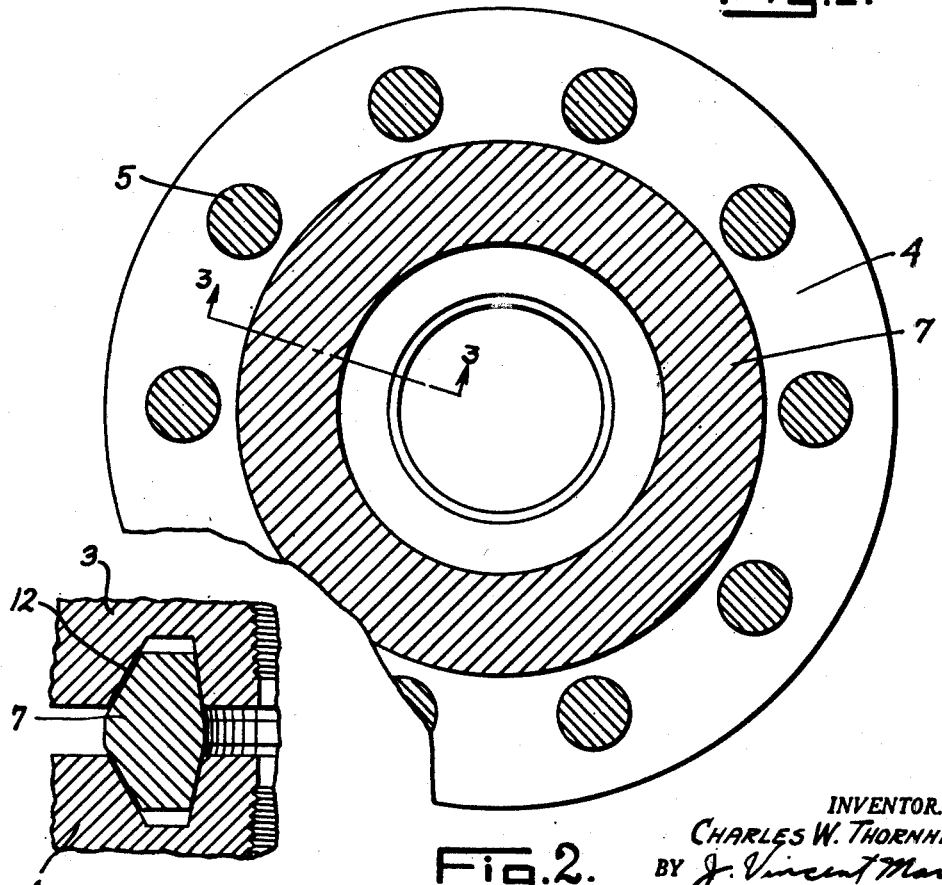
Fig.2.
Fig.3.
INVENTOR.
CHARLES W. THORNHILL.
BY
ATTORNEYS Patented May 15, 1951

2,552,750

UNITED STATES PATENT OFFICE 2,552,750

PIPE JOINT

Charles W. Thornhill, Houston, Tex., assignor to Thornhill-Craver Company, Houston, Tex., a corporation of Texas Application July 6, 1945, Serial No. 603,452

7 Claims. (Cl. 285—137)

This invention relates to a sealing ring for use in sealing together annular members having adjacent opposed surfaces, such as, for example, flanged coupling members or the like.

In the usual constructions of the prior art each of two flanges or other parts to be joined together is provided with a groove, and a metal sealing ring is placed in such grooves and extending between the parts, the parts then being drawn tightly and held together by means of bolts, studs or other holdfast means. In such constructions, the sealing ring and the grooves are provided with complementary engaging surfaces (in most instances oval), so that in the process of drawing the parts together, the ring is wedged into the grooves. The surfaces in engagement on the ring and in the grooves is usually made fairly large and is so disposed with respect to the direction of movement of the parts toward each other that under the stresses developed when the parts are drawn together the ring will not be wedged into its grooves to such an extent as to unduly distort the ring or grooves. On the other hand, if this taper or angle on the engaging portions of the ring and grooves is made small, then when the parts are drawn together by means of bolts or the like, such a wedging force is exerted within the grooves that the ring is either distorted or the grooves are caused to spread and the joint between the parts will leak. It is desirable to have the angle small enough so that a reasonable force exerted on the bolts or the like will provide a seal, but the situation must not be such that an excessive force exerted on the bolts will destroy the ring or the grooves.

The improvement over the structures of the prior art, set forth herein, consists in the shape and arrangement of the ring with respect to the grooves in the parts.

An object of the invention is to provide an improved sealing ring and groove into which said ring fits.

Another object is to provide a structure in which the sealing force will be exerted along a small wedge angle so as to provide a tight seal even when only a small sealing force is exerted.

Another object is to provide a structure in which, after the parts have travelled a sufficient distance to provide a tight seal, the wedging angle between the ring and its grooves will be automatically increased to such an extent that the additional force applied to the parts cannot distort the ring and grooves as it would if the angle remained small.

Still another object is to provide a ring and groove construction which cannot be distorted by a greater force applied subsequently to the time that a proper seal has been established.

Other objects, inherent in the invention, will appear as the description proceeds.

Referring to the accompanying drawings:

Figure 1 represents a sectional view showing two conduits, having flanged coupling members, being joined together and sealed in accordance with the teachings of this invention;

Figure 2 is a horizontal sectional view taken on the line 2—2 of Figure 1; and

Figure 3 is a sectional view taken on the line 3—3 of Figure 2, showing the relation between the sealing ring and grooves before the flanges are drawn tightly toward each other to form a seal.

In the figures shown, the same reference characters are used throughout.

In Figure 1, two conduits 1 and 2, provided with screw threaded ends, are to be brought together by securing means through which a fluid tight joint is to be maintained. To this end, conduit 1 has secured to it a flanged member 3 and conduit 2 has secured to it a flanged member 4, both flanged members being shaped as shown. The respective flanged members are provided with a plurality of bolt holes, lying on a common bolt circle, through which holes securing bolts 5 are passed, said bolts being provided with securing nuts 6.

Each flanged member is provided with an annular groove, shaped as shown, the grooves in the respective members being identical and being opposed to each other. The sealing ring 7, made of metal or equivalent slightly deformable material sufficiently strong to resist distortion is placed in these grooves, before the flanges are joined together by tightening up on the nuts 6. The grooves are defined by the sides 8 and 10 and by the bottom 9. The sealing ring is shaped to conform to the grooves, as shown.

In order to accomplish the objects of the invention, the side of the ring and the side 8 of the groove which is toward the inside of the annulus are made on a relatively slight taper so that a relatively small force exerted to draw the parts together will cause the ring 7 to be wedged against these relatively slight angled sides with a sufficiently great unit stress on the wedging surfaces to provide a seal. However, the ring 7 is made of such a size that at first it will seat only upon this inner side surface just referred to. Therefore, the angle of the outer side surface will have substantially little effect upon the unit sealing forces exerted between the inside surfaces of the ring 7 and the groove. In actual practice the parts will be of such a size that when the inside surfaces of the ring and groove come in contact with each other, the outside surfaces will be separated from each other, as shown at 12, Figure 3, and will not contact until the ring has moved into the groove, say, one-thousandth of an inch. This movement will be sufficient to provide an adequate seal between the inside surfaces of the ring and groove but will be insufficient to appreciably distort those surfaces, and when the ring has moved this far, the outside surfaces of the ring and groove will come into contact with each other. The outside surfaces of the ring and groove are made on a substantially larger angle than the inside surfaces and the effect, when the outside surfaces come in contact with each other, will be to so greatly increase the wedge angle of the ring within the groove that the movement of the ring into the groove will be arrested and will not be resumed even though considerably larger forces be exerted on the bolts to pull the parts together.

In actual practice, the angle of the inside wall on the ring and groove side 8 might be any angle greater than nine degrees, measured from the vertical, which is the sticking angle for most metal parts, and the angle of the outside wall of the ring and the groove side 10 might be any angle substantially greater than said inside angle. The outside angle is measured from the vertical, also.

Thus, it will be seen that the inside angle may be made small enough to provide for an adequate seal, even though the force pulling the parts together is relatively small, but the ring and groove cannot be distorted by a greater force because as soon as the ring has moved into the groove sufficiently to establish a proper seal, the outer wedge surfaces of the ring and groove will come in contact with each other and by virtue of their much greater angle will support such increased forces and prevent further movement of the ring into the groove. Thus, the lateral pressure and overstressing, otherwise exerted by the inside surface of the ring on its seat 8 will be avoided.

It will be obvious to those skilled in the art that changes and modifications may be made without departing from my invention, and I, therefore, aim in the appended claims to cover all such changes and modifications as fall within the true spirit and scope of my invention. Thus, it is evident that this invention may be employed in sealing together surfaces of parts other than flanges of a coupling and where such parts are drawn together by means other than bolts.

What I claim as new and desire to secure by Letters Patent of the United States, is:

1. In a structure of the class described, the combination of a pair of members to be sealed together against the escape of fluid under pressure, said members being provided with similar opposed annular grooves, each groove being defined by a bottom wall and inclined side walls with the inclination of one side wall being at a different angle than the inclination of the other side wall, and an annular sealing ring of distortion-resisting material positioned in said grooves and having its inner and outer surfaces tapered toward the opposite ends of the ring and having its inner and outer surfaces so related to said grooves in size that its inclined inner surfaces will engage the inner wall of each of said grooves before said outer surfaces engage the inclined outer walls of said grooves as the ring is forced into the grooves, the angle of inclination of the outer surfaces of the grooves being such that said surfaces coact with the outer surface of the ring to provide a stop for limiting the movement of the ring relative to the grooves.

2. In a structure of the class described, the combination of a pair of members to be sealed together against the escape of fluid under pressure, said members being provided with opposed annular grooves, each groove being defined by a bottom wall and inclined side walls with the inclination of one side wall being at a different angle than the inclination of the other side wall, and an annular sealing ring of distortion-resisting material positioned in said grooves and having its inner and outer surfaces tapered toward the opposite ends of the ring and having its inner and outer surfaces so related to said grooves in size that one of said surfaces will engage the corresponding wall of each of said grooves before the other of said surfaces engages the other wall of each of said grooves as the ring is forced into said grooves, the included angle between said surfaces being greater than the critical or frictional angle for the materials of the grooved members and ring.

3. In a structure of the class described, the combination of a pair of members to be sealed together against the escape of fluid under pressure, said members being provided with opposed annular grooves, the surface of the outside wall of each groove being disposed at a substantially larger angle to the axis of the groove than the surface of the inside wall of each groove, said surfaces converging toward the base of said groove, and an annular sealing ring of distortion-resisting material positioned in said grooves and of a size to engage the inner wall of each of said grooves before engaging the outer wall thereof.

4. In a structure of the class described, the combination of a pair of members to be sealed together against the escape of fluid under pressure, said members being provided with opposed annular grooves, the surface of one wall of each groove being disposed at a substantially larger angle to the axis of the groove than the surface of the other wall thereof, said surfaces converging toward the base of said groove, and an annular sealing ring of distortion resisting material positioned in said grooves and of a size to engage the last mentioned wall of each of said grooves before engaging the first mentioned wall thereof, the angle of said last mentioned wall of each of the grooves being sufficient to coact with the outer inclined surfaces of the grooves to form a stop which limits the movement of the ring with respect to the grooves upon connection of the members.

5. In a structure of the class described, the combination of a pair of members to be sealed together against the escape of fluid under pressure, said members being provided with opposed annular grooves, the surface of the outside wall of each groove being disposed at a substantially larger angle to the axis of the groove than the surface of the inside wall of each groove, said surfaces converging toward the base of said groove, and an annular sealing ring of distortion resisting material positioned in said grooves and arranged to sealingly engage the inner wall of each of said grooves whereby to seal said members at any point of adjustment thereof, the inner and outer surfaces of said ring conforming to the wall surfaces of said grooves and arranged to initially sealingly engage the inner wall of each of said grooves whereby to seal said members at one point of adjustment thereof and contacting said outside wall surface of each groove upon further adjustment of said flanges and prevent further movement of said sealing ring into said grooves.

6. In a structure of the class described, the combination of a pair of members to be sealed together against the escape of fluid under pressure, said members being provided with opposed annular grooves, the surface of the outside wall of each groove being disposed at a substantially larger angle to the axis of the groove than the surface of the inside wall of each groove, said surfaces converging toward the base of said groove, and an annular sealing ring of distortion resisting material positioned in said grooves and arranged to sealingly engage the inner wall of each of said grooves whereby to seal said members at any point of adjustment thereof, and having inner and outer surfaces conforming to the wall surfaces of said grooves and arranged to sealingly engage the inner wall of each of said grooves whereby to seal said members at one point of adjustment thereof and contacting said outside wall surface of each groove upon further adjustment of said members and prevent further movement of said sealing ring into said grooves and avoid lateral pressure exerted by the inside surface of said ring on its groove wall surface.

7. In a structure of the class described, the combination of a pair of members to be sealed together against the escape of fluid under pressure, each of said members being provided with opposed annular grooves, and an annular sealing ring of distortion resisting material positioned in said grooves and arranged to sealingly engage the inner wall of each of said grooves along a small wedge angle which is of an inclination greater than the critical or frictional angle for the materials of the grooved members and ring, whereby to seal said flanges at any point of adjustment thereof, and to engage the outer wall of each of said grooves along a larger wedge angle which is of sufficient inclination to function as a stop upon movement of the members toward each other after the ring has sealingly engaged the inner wall of the grooves to limit movement of the ring into the groove.

CHARLES W. THORNHILL.

REFERENCES CITED

The following references are of record in the file of this patent:

UNITED STATES PATENTS

| Number | Name | Date |
|---|---|---|
| 1,567,813 | Oleson | Dec. 29, 1925 |
| 1,821,862 | Wilson | Sept. 1, 1931 |

FOREIGN PATENTS

| Number | Country | Date |
|---|---|---|
| 29,083 | Switzerland | June 5, 1903 |